(12) United States Patent
Liu et al.

(10) Patent No.: US 9,785,270 B2
(45) Date of Patent: Oct. 10, 2017

(54) TOUCH SUBSTRATE, TOUCH DISPLAY DEVICE HAVING THE SAME, AND METHOD OF MANUFACTURING THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaoliang Ding, Beijing (CN); Weijie Zhao, Beijing (CN); Shengji Yang, Beijing (CN); Liguang Deng, Beijing (CN)

(73) Assignees: BOE TECHNOLOGY GROUP CO., LTD., Chaoyang District, Beijing (CN); BEIJING BOE OPTOELECTRONICS TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/030,590

(22) PCT Filed: Dec. 10, 2015

(86) PCT No.: PCT/CN2015/097049
§ 371 (c)(1),
(2) Date: Apr. 19, 2016

(87) PCT Pub. No.: WO2016/180015
PCT Pub. Date: Nov. 17, 2016

(65) Prior Publication Data
US 2017/0153731 A1    Jun. 1, 2017

(30) Foreign Application Priority Data
May 11, 2015 (CN) .......................... 2015 1 0236341

(51) Int. Cl.
*G06F 3/041* (2006.01)
*G06F 3/044* (2006.01)
*G02F 1/1362* (2006.01)

(52) U.S. Cl.
CPC ............ *G06F 3/0412* (2013.01); *G06F 3/044* (2013.01); *G02F 2001/136218* (2013.01);
(Continued)

(58) Field of Classification Search
CPC .......... G02F 2001/13629; G02F 2001/136218; G02F 2001/134318; G02F 2201/123;
(Continued)

(56) References Cited

U.S. PATENT DOCUMENTS 8,704,796 B2 * 4/2014 Nishitani ................ G06F 3/044
345/173
9,100,020 B2 * 8/2015 Yamauchi ............ H03K 17/962
(Continued)

FOREIGN PATENT DOCUMENTS

CN  104035615 A  9/2014
CN  104216564 A  12/2014
(Continued)

OTHER PUBLICATIONS

International Search Report & Written Opinion dated Mar. 4, 2016 regarding PCT/CN2015/097049.

*Primary Examiner* — Sanjiv Patel
(74) *Attorney, Agent, or Firm* — Intellectual Valley Law, P.C.

(57) ABSTRACT

The present application discloses a touch substrate comprising a first touch electrode connected to a first touch signal line, and a first shield electrode positioned between the first touch electrode and a second touch signal line, and configured to electrically shield the first touch electrode from the second touch signal line. The second touch signal line is
(Continued)

connected to a second touch electrode and not connected to the first touch electrode, and the second touch signal line has a first portion which overlaps with the first touch electrode.

20 Claims, 2 Drawing Sheets

(52) U.S. Cl.
CPC .............. *G06F 2203/04103* (2013.01); *G06F 2203/04107* (2013.01); *G06F 2203/04111* (2013.01); *G09G 2320/0209* (2013.01)

(58) Field of Classification Search
CPC .............. G02F 1/133345; G02F 1/155; G09G 2320/0209; G09G 2300/0426; H01L 27/124; H01L 27/3276; G06F 2203/04107; G06F 2203/04112; G06F 2203/04103; G06F 3/041–3/048
See application file for complete search history.

(56) References Cited

U.S. PATENT DOCUMENTS

| | | | | |
|---|---|---|---|---|
| 2008/0180584 | A1* | 7/2008 | Utsunomiya | G06F 3/044 349/12 |
| 2010/0315362 | A1* | 12/2010 | Cheng | G06F 3/0412 345/173 |
| 2010/0328266 | A1* | 12/2010 | Yamauchi | H03K 17/962 345/174 |
| 2010/0330371 | A1* | 12/2010 | Yamauchi | H03K 17/962 428/411.1 |
| 2012/0075237 | A1* | 3/2012 | Ikeda | G06F 3/044 345/174 |
| 2013/0321293 | A1* | 12/2013 | Park | G06F 3/041 345/173 |
| 2013/0342770 | A1 | 12/2013 | Kim et al. | |
| 2014/0168539 | A1* | 6/2014 | Kim | G06F 3/041 349/12 |
| 2015/0042908 | A1 | 2/2015 | Wang et al. | |
| 2015/0084888 | A1* | 3/2015 | Han | G06F 3/0412 345/173 |
| 2015/0338951 | A1* | 11/2015 | Lee | G06F 3/044 345/174 |

FOREIGN PATENT DOCUMENTS

| | | |
|---|---|---|
| CN | 104407760 A | 3/2015 |
| CN | 104698702 A | 6/2015 |
| CN | 104793803 A | 7/2015 |
| JP | 2011138515 A | 7/2011 |

\* cited by examiner

TOUCH SUBSTRATE, TOUCH DISPLAY DEVICE HAVING THE SAME, AND METHOD OF MANUFACTURING THEREOF

CROSS-REFERENCE TO RELATED APPLICATION

This application is a national stage application under 35 U.S.C. §371 of International Application No. PCT/CN2015/097049 filed Dec. 10, 2015, which claims priority to Chinese Patent Application No. 201510236341.3, filed May 11, 2015, the contents of which are incorporated by reference in the entirety.

FIELD

The present invention relates to touch control display technology, particularly to a touch substrate, a touch display device having the same, and a method of manufacturing thereof.

BACKGROUND

In an out-cell touch control panel, a touch module is added onto a display module. The two modules can be manufactured separately. The in-cell touch control technology integrates the touch sensor within the display unit. The display panel does not need to be bonded with an additional touch panel so as to simplify the assembly procedure.

A conventional touch substrate is shown in FIG. 1, which is integrated with an array substrate, e.g., in a liquid crystal display panel. The touch substrate as shown in FIG. 1 includes a common electrode 2, some of which also serve as touch electrodes 1. These common/touch electrodes can be used for conducting touch signals in touch control mode, or for applying common voltage in display mode. The touch substrate can include some common electrodes that do not serve as touch electrodes. In a mutual capacitive touch control device, the touch electrode 1 can be a touch scanning electrode ($T_x$), whereas the touch sensing electrode ($R_x$) can be disposed on the color filter substrate. In a self-capacitive touch control device, the touch electrode 1 can achieve touch control function alone.

The touch electrode 1 can be connected to a drive chip via a touch signal line 11. The touch signal line 11 connected to a touch electrode 1 in the center of the touch substrate overlaps with other touch electrodes 1 located peripherally on the touch substrate. This results in induction with the overlapping touch electrodes and crosstalk between touch electrodes 1. The touch control and display quality may be affected.

SUMMARY

The present invention provides a touch substrate comprising a first touch electrode connected to a first touch signal line; a second touch signal line connected to a second touch electrode, wherein the second touch signal line is not connected to the first touch electrode, and the second touch signal line has a first portion which overlaps with the first touch electrode; and a first shield electrode positioned between the first touch electrode and the second touch signal line, and configured to electrically shield the first touch electrode from the overlapping second touch signal line. Optionally, the first shield electrode is connected to ground. Optionally, the first shield electrode is connected to the first touch electrode. Optionally, the touch substrate further comprises a common electrode layer comprising a common electrode and the first touch electrode; wherein the first touch electrode and the common electrode are operated in a time-division driving mode. Optionally, the touch substrate further comprises a substrate; a pixel electrode layer comprising a pixel electrode and the shield electrode; wherein the second touch signal line, the pixel electrode, the touch electrode are sequentially arranged on the substrate along a direction away from the substrate, and the shield electrode is disposed spaced apart from the pixel electrode. Optionally, the first touch electrode is a touch scanning electrode. Optionally, the touch substrate further comprises a plurality of touch electrodes each of which connected with a corresponding touch signal line; a plurality of touch signal lines, wherein at least some of the plurality of touch signal lines overlap with some of the plurality of touch electrodes; each of the plurality of touch signal lines comprises one or more portions, each of which overlapping with one of the plurality of touch electrodes not connected to the overlapping touch signal line, resulting in a plurality of overlapping portions between the plurality of touch electrodes and the plurality of touch signal lines; and a plurality of shield electrodes positioned at the plurality of overlapping portions between the plurality of touch electrodes and the plurality of touch signal lines, and configured to electrically shield the plurality of touch electrodes from the overlapping plurality of touch signal lines. Optionally, the touch substrate further comprises a plurality of pixel electrodes; and a common electrode layer comprising a common electrode and the touch electrodes; wherein the touch electrodes and the common electrode are operated in a time-division driving mode. Optionally, the touch substrate further comprises a substrate; wherein a pattern comprising the plurality of touch signal lines, a pattern comprising the plurality of pixel electrodes, and a pattern comprising a plurality of common electrodes are sequentially arranged on the substrate along a direction away from the substrate, and the shield electrode is disposed spaced apart from the pixel electrode. Optionally, each of the plurality of touch electrodes comprises a plurality of sub-pixels, and the shield electrode is disposed between neighboring sub-pixels. Optionally, the touch substrate further comprises a plurality of ancillary shield electrodes disposed at positions which are not the overlapping portions. Optionally, the touch substrate comprises a plurality of shield positions evenly distributed over the touch substrate, the shield position can be either a position occupied by the shield electrode or a position occupied by the ancillary shield electrode.

The present invention also provides a method of manufacturing a touch substrate, comprising forming an array of a plurality of touch signal lines; forming an array of a plurality of touch electrodes on a substrate for sensing a touch, each touch electrode connected to a corresponding touch signal line in the array of touch signal lines; wherein at least some of the plurality of touch signal lines overlap with some of the plurality of touch electrodes; each of the overlapping plurality of touch signal lines comprises one or more portions, each of which overlapping with one of the plurality of touch electrodes not connected to the overlapping touch signal line, resulting in a plurality of overlapping portions between the plurality of touch electrodes and the plurality of touch signal lines; and forming an array of a plurality of shield electrodes comprising a plurality of main shield electrodes positioned at the plurality of overlapping portions between the plurality of touch electrodes and the plurality of touch signal lines, and configured to electrically shield the plurality of touch electrodes from the overlapping plurality of touch signal lines. Optionally, the shield electrodes are connected to ground. Optionally, the shield electrodes are connected to corresponding touch electrode overlapping with the shield electrodes. Optionally, the method further comprises forming a pixel electrode layer comprising an array of pixel electrodes and the array of shield electrodes; and forming a common electrode layer comprising an array of common electrodes and the touch electrodes. Optionally, the array of touch signal lines, the array of pixel electrodes, the array of common electrodes are sequentially arranged on the substrate along a direction away from the substrate, and the shield electrodes are disposed spaced apart from the pixel electrodes. Optionally, the array of shield electrodes further comprising a plurality of ancillary shield electrodes disposed at positions which are not the overlapping portions. Optionally, the touch substrate comprises a plurality of shield positions evenly distributed over the touch substrate, the shield position can be either a position occupied by the main shield electrode or a position occupied by the ancillary shield electrode.

The present invention further provides a touch display device comprising a touch substrate described herein, or a touch display device manufactured according to a method described herein.

BRIEF DESCRIPTION OF THE FIGURES

The following drawings are merely examples for illustrative purposes according to various disclosed embodiments and are not intended to limit the scope of the present invention.

DETAILED DESCRIPTION OF THE EMBODIMENTS

The disclosure will now describe more specifically with reference to the following embodiments. It is to be noted that the following descriptions of preferred embodiments are presented herein for purpose of illustration and description only. It is not intended to be exhaustive or to be limited to the precise form disclosed.

Figure 1:
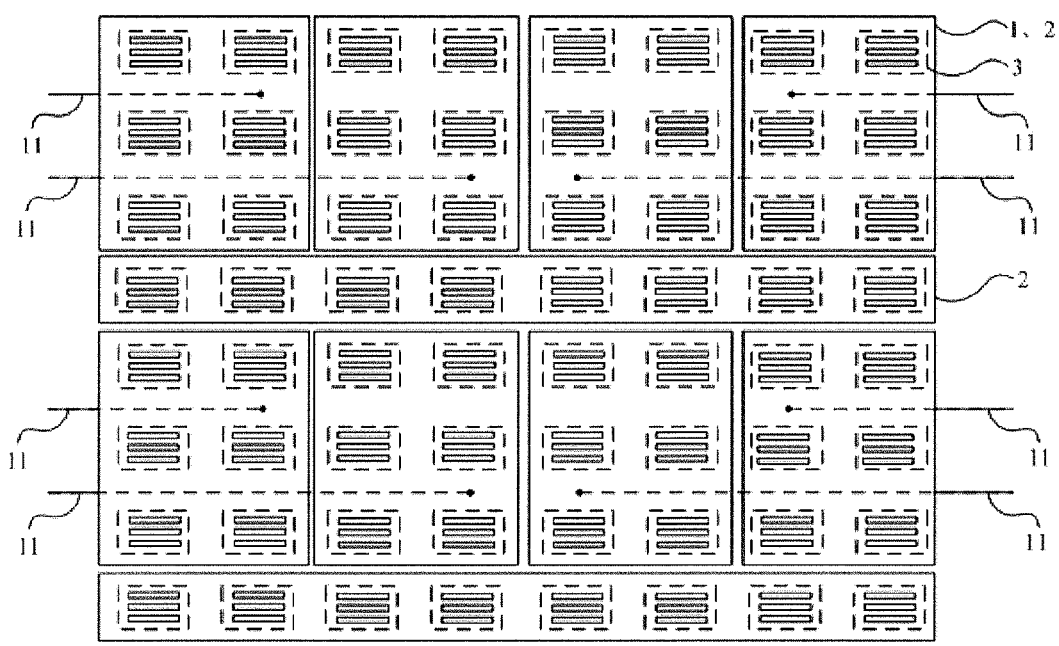
FIG. 1 shows a top plan view of a conventional touch substrate.
Figure 2:
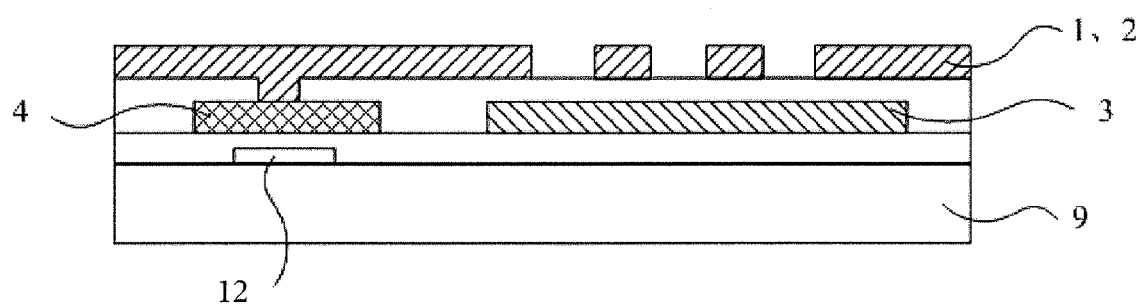
FIG. 2 shows a cross-sectional view along the A-A' direction of the touch substrate in FIG. 3.
Figure 3:
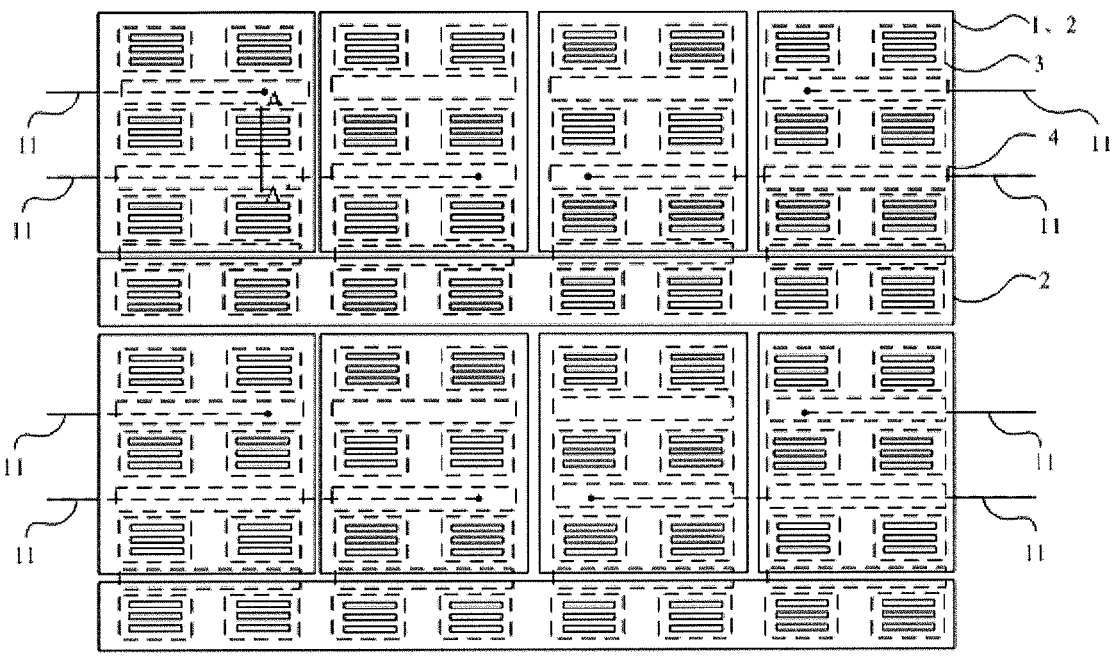
FIG. 3 shows a top plan view of a touch substrate according to one embodiment.

FIG. 2 is a cross-sectional view along the A-A' direction of the touch substrate in FIG. 3. Referring to FIG. 2, the touch substrate of the embodiment includes a first touch electrode 1, a second touch signal line 12, and a first shield electrode 4 positioned between the first touch electrode 1 and the second touch signal line 12. The first touch electrode 1 is connected to a first touch signal line, and the second touch signal line 12 is connected to a second touch electrode. As shown in FIG. 2, the second touch signal line 12 is not connected to the first touch electrode 1. The second touch signal line 12 has a first portion which overlaps with the first touch electrode 1 in plan view of the touch substrate. The first shield electrode 4 is configured to electrically shield the first touch electrode 1 from the overlapping second touch signal line 12.

The touch substrate in the embodiment can be an independent touch sensor, or a substrate integrated within a display module. The touch substrate can be a self-capacitive type touch substrate or a mutual capacitive type touch substrate. The self-capacitive type touch substrate has a construction in which a plurality of independent patterns are formed in the touch area. In the self-capacitive type touch panel, the touched positions are detected by measuring change of capacitances of the independent patterns. The mutual capacitive type touch substrate has a matrix construction in which first electrode patterns (e.g., touch scanning electrodes) arranged in an x-axis direction cross over second electrode patterns (e.g., touch sensing electrodes) arranged in a y-axis directed. In the mutual capacitive type touch panel, the touched positions are detected by measuring changes of capacitances appeared to sensing nodes through the touch sensing electrodes after supplying a scanning voltage to the touch scanning electrodes. The sensing nodes are cross points of the touch scanning and sensing electrodes.

The first touch electrode 1 can be a touch electrode in a self-capacitive type touch substrate, or a touch electrode in a mutual capacitive type touch substrate (e.g., a touch scanning electrode). The touch substrate can have a plurality of shield electrode 4 disposed and configured to electrically shield some or all touch electrodes, e.g., touch scanning electrodes, from the overlapping touch signal lines. Optionally, the touch substrate includes a common electrode layer having a common electrode 2 and the first touch electrode 1. Optionally, the common electrode 2 and the first touch electrode 1 are operated in a time-division driving mode. For example, the first touch electrode 1 can be used for conducting touch signals in touch control mode, or for applying common voltage in display mode. Optionally, the first touch electrode 1 is only operated in touch control mode. Optionally, at least some common electrodes are only operated in display mode, and not in a time-division driving mode.

The shield electrode can be made of, e.g., a conductive material such as a metal, indium tin oxide (ITO), indium zinc oxide (IZO), indium gallium zinc oxide (IGZO). Optionally, the shield electrode receives a ground voltage, e.g., connected to the ground voltage terminal of the touch substrate. Optionally, the shield electrode can be connected to the overlapping touch electrode, e.g., through a via.

Referring to FIG. 2, the touch substrate in the embodiment includes a substrate 9. The touch signal line 12, the pixel electrode 3, the common/touch electrode 1, 2 are sequentially arranged on the substrate 9 along a direction away from the substrate 9. The shield electrode 4 is disposed spaced apart from the pixel electrode 3 and on a same layer. As used herein, the term "same layer" refers to the relationship between the layers simultaneously formed in the same step. In one example, two electrodes are one the same layer when the two electrodes are formed as a result of one or more steps of a same patterning process performed on a same layer of material. In another example, the shield electrode 4 and the pixel electrode 3 can be formed in the same layer by simultaneously performing the step of forming the shield electrode 4 and the step of forming the pixel electrode 3. The term "same layer" does not always mean that the thickness of the layer or the height of the layer in a cross-sectional view is the same. Optionally, the shield electrode 4 and the pixel electrode 3 are not disposed on a same layer. The steps may be performed using a patterning process. For example, a photoresist may be formed on an interlayer insulation layer and a mask having a predetermined pattern may be placed on the photoresist layer, followed by UV exposure, development, baking and etching, thereby forming a layer having the shield electrodes 4 and the pixel electrodes 3.

Optionally, the touch substrate includes a substrate 9, a pixel electrode layer having a pixel electrode 3 and a shield electrode 4. The second touch signal line 12, the pixel electrode 3, the touch electrode 1 are sequentially arranged on the substrate along a direction away from the substrate, and the shield electrode 4 is disposed spaced apart from the pixel electrode 3.

Referring to FIG. 2, the touch electrode 1 in the embodiment includes a plurality of sub-pixels. Optionally, the shield electrode 4 is disposed between neighboring sub-pixels. In some embodiments, the touch electrode 1 is not operated in a time-division driving mode, but is only operated in touch control mode. In some embodiments, the touch electrode 1 is a common/touch electrode 1, 2 as shown in FIG. 2, operated in a time-division driving mode. Optionally, the touch substrate includes a common electrode layer having the common electrode 2 and the first touch electrode 1. Optionally, the touch electrode 1 and the common electrode 2 are operated in a time-division driving mode. When a common electrode 2 or a common/touch electrode 1, 2 is used, the electrode can optionally be a slit electrode. The touch substrate may further include various insulating layers between various conductive layers.

FIG. 3 is a top plan view of a touch substrate according to one embodiment. Referring to FIG. 3, the touch substrate in the embodiment comprises a plurality of touch electrodes 1 and a plurality of touch signal lines 11. Each of the touch electrode 1 in the embodiment is connected with a corresponding touch signal line 11. As shown in FIG. 3, the touch signal line 11 connected to a touch electrode 1 at the peripheral edge of the touch substrate does not go through any other touch electrodes 1 therefore does not overlap with any other touch electrodes 1. However, the touch signal line 11 connected to a touch electrode 1 in the center of the touch substrate goes through the touch electrodes 1 located peripherally in the touch substrate therefore overlaps with the peripheral touch electrodes 1. Depending on the number of peripheral touch electrodes 1 a touch signal line 11 has to go through, the touch signal line 11 may have one or more portions, each of which overlapping with one of the plurality of peripheral touch electrodes 1 not connected to the overlapping touch signal line 11. Thus, a touch signal line 11 may have one or more overlapping portions between the touch signal line 11 and one or more touch electrodes 1 not connected to the overlapping touch signal line 11. The touch substrate in the embodiment have a plurality of overlapping portions between the plurality of touch electrodes 1 and the plurality of touch signal lines 11.

Referring to FIG. 3, the touch substrate in the embodiment includes a plurality of shield electrodes 4 positioned at the plurality of overlapping portions between the plurality of touch electrodes 1 and the plurality of touch signal lines 11. The shield electrodes 4 are configured to electrically shield the plurality of touch electrodes 1 from the overlapping plurality of touch signal lines 11. As used herein, an "overlapping portion" of a touch signal line 11 refers to a portion of a touch signal line 11 over which the touch signal line 11 overlaps with a touch electrode 1 which is not connected to the overlapping touch signal line. Accordingly, an "overlapping portion" as used herein does not refer to the portion of a touch signal line 11 over which the touch signal line 11 overlaps with a touch electrode 1 connected thereto. However, a shield electrode is not limited to the overlapping portions, but optionally can be disposed in a non-overlapping portion, e.g., a portion over which the touch signal line 11 overlaps with a touch electrode 1 connected to the overlapping touch signal line 11. As used herein, a shield electrode disposed in an overlapping portion is also referred to as a main shield electrode, and a shield electrode disposed in a non-overlapping portion is referred to as an ancillary shield electrode.

Based on the above, the touch substrate optionally can further include one or more ancillary shield electrodes disposed at a position which is not an overlapping portion, i.e., a non-overlapping portion. Referring to FIG. 3, for example, the four shield electrodes on the top row of the touch electrode 1 are ancillary shield electrodes. The touch substrate in the embodiment has a plurality of shield positions evenly distributed over the touch substrate. The shield position can be either a position occupied by a main shield electrode or a position occupied by an ancillary shield electrode. In some embodiments, not every position corresponding to an overlapping portion is occupied by a shield electrode 4. In some embodiments, not every position corresponding to a non-overlapping portion is occupied by an ancillary shield electrode. Optionally, every position corresponding to an overlapping portion is occupied by a shield electrode 4. Optionally, every position corresponding to a non-overlapping portion is occupied by an ancillary shield electrode. Optionally, the touch substrate has a plurality of shield positions evenly distributed over the touch substrate, even though some overlapping portions and/or some non-overlapping portions are not occupied by a main shield electrode or an ancillary shield electrode. Optionally, the touch substrate has a plurality of shield positions evenly distributed over the touch substrate, and all positions corresponding to overlapping or to non-overlapping portions are occupied by either a main shield electrode or an ancillary shield electrode.

Referring to FIG. 3, the touch substrate in the embodiment further includes a plurality of pixel electrodes 3 and a plurality of common electrodes 2. Two types of common electrode 2 may be utilized in various embodiments. The first type only serves as a common electrode 2, i.e., an electrode that applies common voltage when the touch panel is in display model. The second type is a common/touch electrode 1, 2 operated in a time-division driving mode, i.e., an electrode that conducts touch signals when the touch panel is in touch control mode, and applies a common voltage when the touch panel is in display mode. In FIG. 3, the touch electrode 1 at the top right corner is an example of the common/touch electrode 1, 2. Optionally, the touch substrate includes a common electrode layer having the common electrode 2 and the first touch electrode 1. Optionally, the common electrode 2 and the first touch electrode 1 are operated in a time-division driving mode.

Figure 4:
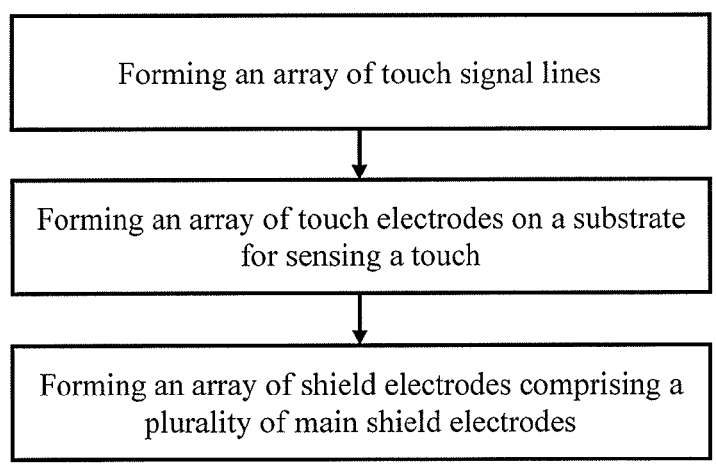
FIG. 4 is a flow chart illustrating a method of manufacturing touch substrate according to one embodiment.

FIG. 4 is a flow chart illustrating a method of manufacturing touch substrate according to one embodiment. Referring to FIG. 4, the method in the embodiment includes a step of forming an array of a plurality of touch signal lines, a step of forming an array of a plurality of touch electrodes on a substrate for sensing a touch, and a step of forming an array of a plurality of shield electrodes comprising a plurality of main shield electrodes. Each touch electrode in the array of touch electrodes is connected to a corresponding touch signal line in the array of touch signal lines. The method steps as described herein are not necessarily performed sequentially, and in general can be performed in parallel with each other wherever possible.

In some embodiments, at least some of the plurality of touch signal lines overlap with at least some of the plurality of the touch electrodes. Each of the plurality of touch signal lines has one or more portions, each of which overlapping with one of the plurality of touch electrodes not connected to the overlapping touch signal line, resulting in a plurality of overlapping portions between the plurality of touch electrodes and the plurality of touch signal lines. The plurality of main shield electrodes are positioned at the plurality of overlapping portions between the plurality of touch electrodes and the plurality of touch signal lines, and are configured to electrically shield the plurality of touch electrodes from the overlapping plurality of touch signal lines.

The method in one embodiments further includes a step of forming an array of pixel electrodes and a step of forming an array of common electrodes. Optionally, the array of touch signal lines, the array of pixel electrodes, the array of common electrodes are sequentially arranged on the substrate along a direction away from the substrate, and the shield electrode is disposed spaced apart from the pixel electrode and on a same layer. Optionally, at least some common electrodes and touch electrodes are operated in a time-division driving mode. Optionally, at least some common electrodes are only operated in display mode.

In some embodiments, the method comprises a step of forming an array of touch signal lines, a step of forming a pixel electrode layer having an array of pixel electrodes and an array of shield electrodes, wherein the pixel electrodes and the shield electrodes are spaced apart; a step of forming a common electrode layer having an array of common electrodes and touch electrodes on a substrate for sensing a touch, wherein at least some of the common electrode and the touch electrodes are operated in a time-division driving mode.

In some embodiments, the array of shield electrodes further comprises a plurality of ancillary shield electrodes disposed at positions which are not the overlapping portions. The touch substrate has a plurality of shield positions evenly distributed over the touch substrate. The shield position can be either a position occupied by the shield electrode or a position occupied by the ancillary shield electrode.

In some embodiments, the method of manufacturing a touch substrate comprises one or more, or combinations thereof, of the following: a step of forming a pattern comprising gate electrodes, gate lines, and touch signal lines; a step of forming a gate insulating layer; a step of forming a pattern comprising an active layer; a step of forming a pattern comprising source electrode, drain electrodes, and data lines; a step of forming a interlayer insulation pattern; a step of forming a pixel electrode layer pattern comprising an array of pixel electrodes and an array of shield electrodes wherein the pixel electrodes and the shield electrodes are disposed spaced apart; a step of forming passivation layer; and a step of forming a common electrode layer pattern comprising common electrodes and touch electrodes, wherein at least some of the touch electrodes and the common electrode are operated in a time-division driving mode. The method steps as described herein are not necessarily performed sequentially, and in general can be performed in parallel with each other wherever possible. The steps may be performed using a patterning process. For example, a photoresist may be formed on an interlayer insulation layer and a mask having a predetermined pattern may be placed on the photoresist layer, followed by UV exposure, development, baking and etching, thereby forming a layer having the shield electrodes and the pixel electrodes.

The present invention also provides a touch control display device comprising a touch substrate as described herein, or a touch substrate manufactured by a method as described herein. The touch control display device can be a liquid crystal display panel, an electronic paper, an OLED display panel, a mobile phone, a display panel, a laptop, a digital picture frame, a navigation device, or any device having a display function or component.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A touch substrate comprising:
   a base substrate;
   a plurality of touch electrodes each of which connected with a corresponding touch signal line;
   a plurality of touch signal lines, wherein at least some of the plurality of touch signal lines overlap with some of the plurality of touch electrodes; each of the plurality of touch signal lines comprises one or more portions, each of which overlapping with one of the plurality of touch electrodes not connected to the overlapping touch signal line, resulting in a plurality of overlapping portions between the plurality of touch electrodes and the plurality of touch signal lines;
   a plurality of shield electrodes positioned at the plurality of overlapping portions between the plurality of touch electrodes and the plurality of touch signal lines, and configured to electrically shield the plurality of touch electrodes from the overlapping plurality of touch signal lines; and
   a plurality of pixel electrodes;
   wherein a layer comprising the plurality of pixel electrodes is on a side of a layer comprising the plurality of touch signal lines distal to the base substrate, a layer comprising a plurality of common electrodes is on a side of the layer comprising the plurality of pixel electrodes distal to the layer comprising the plurality of touch signal lines; and each of the plurality of shield electrodes is spaced apart from adjacent pixel electrode of the plurality of pixel electrodes.

2. The touch substrate of claim 1, wherein:

the plurality of touch electrodes comprises a first touch electrode and a second touch electrode;

the plurality of touch signal lines comprises a first touch signal line and a second touch signal line;

the plurality of shield electrodes comprises a first shield electrode;

the first touch electrode is electrically connected to the first touch signal line;

the second touch signal line is electrically connected to the second touch electrode, wherein the second touch signal line is not connected to the first touch electrode, and the second touch signal line has a first portion which overlaps with the first touch electrode;

the first shield electrode is positioned between the first touch electrode and the second touch signal line, and configured to electrically shield the first touch electrode from the overlapping second touch signal line.

3. The touch substrate of claim 2, wherein the first shield electrode is connected to ground.

4. The touch substrate of claim 2, wherein the first shield electrode is connected to the first touch electrode.

5. The touch substrate of claim 2, further comprising:

a common electrode layer comprising a common electrode and the first touch electrode;

wherein the first touch electrode and the common electrode are operated in a time-division driving mode.

6. The touch substrate of claim 2, wherein the first touch electrode is a touch scanning electrode.

7. The touch substrate of claim 1, further comprising:

a plurality of gate lines; and a plurality of gate electrodes;

wherein the plurality of gate lines and the plurality of gate electrodes are in a same layer as the plurality of touch signal lines.

8. The touch substrate of claim 1, further comprising:

a common electrode layer comprising a plurality of common electrodes;

wherein the plurality of touch electrodes and the plurality of common electrodes are in a same layer and operated in a time-division driving mode.

9. The touch substrate of claim 8, wherein the plurality of pixel electrodes and the plurality of shield electrodes are in a same layer.

10. The touch substrate of claim 1, wherein each of the plurality of touch electrodes comprises a plurality of sub-pixels, and the shield electrode is disposed between neighboring sub-pixels.

11. A touch display device comprising a touch substrate of claim 1.

12. A touch substrate, comprising:

a base substrate;

a plurality of touch electrodes each of which connected with a corresponding touch signal line;

a plurality of touch signal lines, wherein at least some of the plurality of touch signal lines overlap with some of the plurality of touch electrodes; each of the plurality of touch signal lines comprises one or more portions, each of which overlapping with one of the plurality of touch electrodes not connected to the overlapping touch signal line, resulting in a plurality of overlapping portions between the plurality of touch electrodes and the plurality of touch signal lines;

a plurality of shield electrodes positioned at the plurality of overlapping portions between the plurality of touch electrodes and the plurality of touch signal lines, and configured to electrically shield the plurality of touch electrodes from the overlapping plurality of touch signal lines; and a plurality of ancillary shield electrodes disposed at positions which are not the overlapping portions.

13. The touch substrate of claim 12, wherein the touch substrate comprises a plurality of shield positions evenly distributed over the touch substrate, the shield position can be either a position occupied by the shield electrode or a position occupied by the ancillary shield electrode.

14. A method of manufacturing a touch substrate, comprising:

forming an array of a plurality of touch signal lines;

forming an array of a plurality of touch electrodes on a base substrate for sensing a touch, each touch electrode connected to a corresponding touch signal line in the array of touch signal lines;

wherein at least some of the plurality of touch signal lines overlap with some of the plurality of touch electrodes; each of the overlapping plurality of touch signal lines comprises one or more portions, each of which overlapping with one of the plurality of touch electrodes not connected to the overlapping touch signal line, resulting in a plurality of overlapping portions between the plurality of touch electrodes and the plurality of touch signal lines;

forming an array of a plurality of shield electrodes comprising a plurality of main shield electrodes positioned at the plurality of overlapping portions between the plurality of touch electrodes and the plurality of touch signal lines, and configured to electrically shield the plurality of touch electrodes from the overlapping plurality of touch signal lines;

forming a pixel electrode layer comprising an array of pixel electrodes and the array of shield electrodes; and forming a common electrode layer comprising an array of common electrodes and the touch electrodes.

15. The method of claim 14, wherein the shield electrodes are connected to ground.

16. The method of claim 14, wherein the shield electrodes are connected to corresponding touch electrode overlapping with the shield electrodes.

17. The method of claim 14, wherein the array of pixel electrodes and the array of shield electrodes are formed in a same layer.

18. The method of claim 14, wherein the array of touch signal lines, the array of pixel electrodes, the array of common electrodes are sequentially arranged on the base substrate along a direction away from the base substrate, and the shield electrodes are disposed spaced apart from the pixel electrodes.

19. The method of claim 14, wherein the array of shield electrodes further comprising a plurality of ancillary shield electrodes disposed at positions which are not the overlapping portions.

20. The method of claim 19, wherein the touch substrate comprises a plurality of shield positions evenly distributed over the touch substrate, the shield position can be either a position occupied by the main shield electrode or a position occupied by the ancillary shield electrode.

* * * * *